June 14, 1938.   G. A. MOORE   2,120,899
METHOD OF MAKING CONTAINERS
Filed July 17, 1934   2 Sheets-Sheet 1
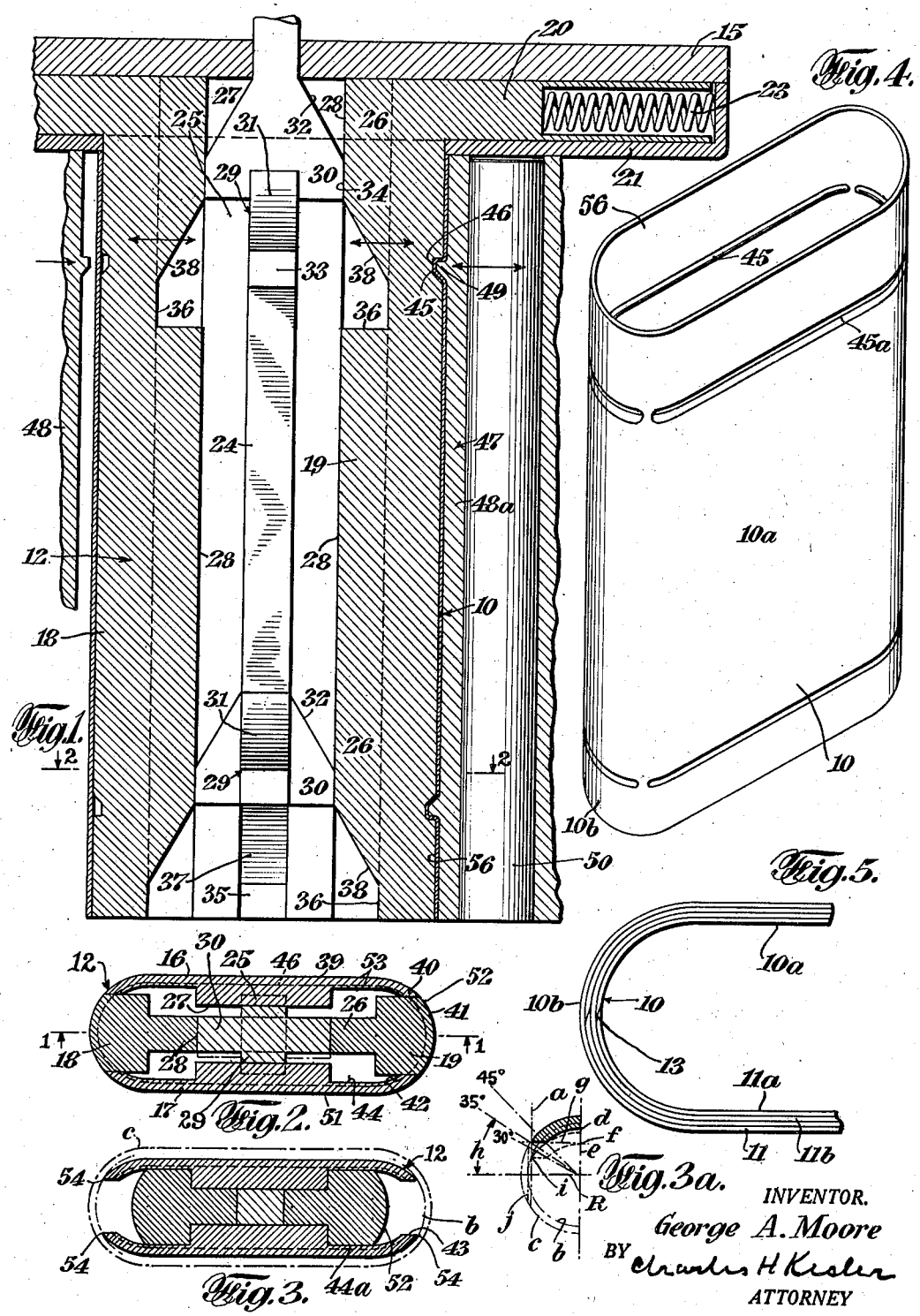
INVENTOR.
George A. Moore
BY Charles H Kisler
ATTORNEY

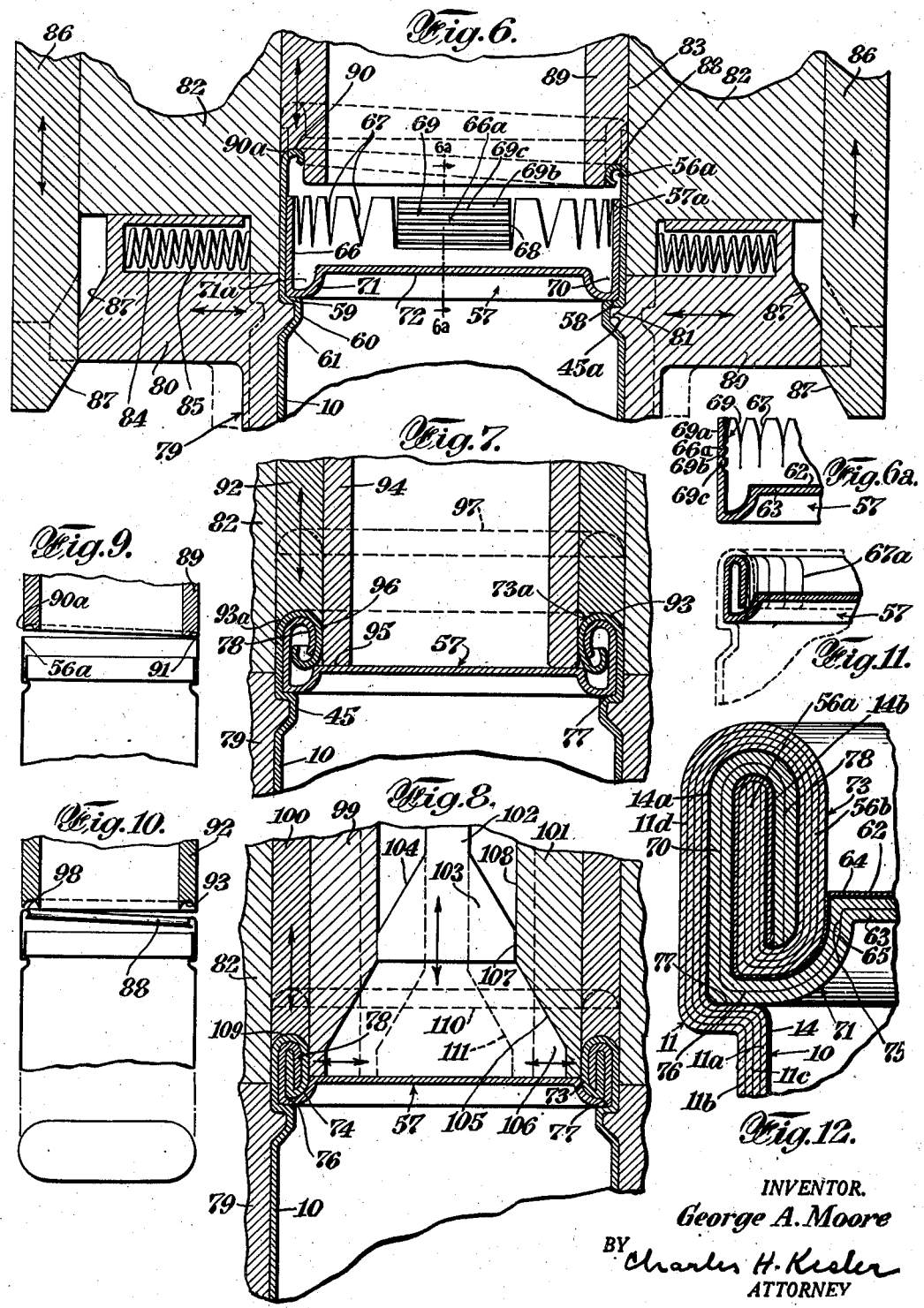

Patented June 14, 1938

2,120,899

UNITED STATES PATENT OFFICE 2,120,899

METHOD OF MAKING CONTAINERS

George Arlington Moore, Louisville, Ky., assignor to Humoco Corporation, Louisville, Ky., a corporation of Delaware Application July 17, 1934, Serial No. 735,563

26 Claims. (Cl. 93—39.1)

My invention relates to methods of fabricating containers comprising paper stock or other fibrous material having paper-like characteristics, or comprising laminations of such paper stock or fibrous materials and foil or metal (said paper stock or fibrous material being referred to herein for convenience of expression as "paper"), and the invention has for its object to produce a container which may be fabricated at low cost without rupturing, distorting or otherwise damaging the material, or imposing stresses or strains thereon liable to interfere with the fabrication or impair the quality of the product, and which is simple, durable and efficient in construction, and substantially impervious to air, moisture, and other fluids.

Further, said invention has for its object to provide a method of causing the material of the marginal portion of the container in forming a reinforcement, seam or joint to flow or curl naturally and freely into a multiple ply relationship without breakdown of or other damage to the material.

Further, said invention has for its object to facilitate the ply forming operation by imposing a directive bias upon the margin of the container wall without crushing, collapsing, breaking down or otherwise damaging the material thereof.

Further, said invention has for its object to facilitate the ply forming operation by controlling the application of pressure to the material so as to overcome the initial resistance thereof to flowing without breaking down the material, or otherwise damaging the same.

Further, said invention has for its object to produce an interlocking seam or joint between a container body and the flanged head therefor with the plies of said seam locked against separation.

Further, said invention has for its object to produce a container of the character specified in which certain or all of the walls thereof consist of a laminated structure composed of layers of paper and foil or similar metal for enhancing the strength and imprevious character of such walls and increasing the strength and durability of said seams or joints and the impervious or hermetic qualities thereof.

Further, said invention has for its object to produce a container shell of greater length than width in cross-section which is retained in shape without bowing or sagging at the wide sides thereof so that the open ends of the shell form sockets of gauge dimensions and shape for receiving the end closures or heads of corresponding shape in close fitting relation thereto.

Further, said invention has for its object to produce a container shell or body and a flanged head to be received therein with the parts in smooth, close fitting relation throughout without wrinkling, ruffling or buckling of the flange, and with the material thereof in condition for allowing the same to be turned over with the body wall into an interlocking seam without break-down or other damage to said material.

Further, said invention has for its object to produce a container other than circular in cross-section, such as containers of oval or oblong cross-section having flat or straight sides connected by curving portions, corners or sides of relatively short radius.

Further, said invention has for its object to provide a method which facilitates the formation of a seam of uniform material content and cross-section throughout the extent thereof when the containers fabricated are other than circular in cross-section.

Further, said invention has for its object to produce a reinforced seam between the container shell and head of reduced projection beyond the base of the head to minimize the effective height of the container.

Further, said invention has for its object to form said joints or seams without requiring the use of supporting dies or mandrels within the confines of the body or shell for receiving the thrust of the seam forming tools or dies.

Further, said invention has for its object to provide a method of forming an inwardly directed bead in the wall of the container shell capable of serving as an abutment or ledge for centering or positioning the head within the container shell and receiving the thrust thereof.

Further, said invention has for its object to provide a method of effecting an interlocking engagement between the seam plies and said head and forming an elastic, hermetic joint between said head and the bead or abutment formed in the shell or body of said container.

Further, said invention has for its object to form the seam or joint between the shell body and flanged head thereof by utilizing said bead and the complementary groove thereof for supporting the container during the seam forming operation, and receiving the thrust imposed on the material by said operation.

Further, said invention has for its object to provide a method in which the container shell and the flanged head are assembled with the walls thereof in a smooth, close fitting relation to each other and properly aligned with the seam forming tools, and with the material thereof in condition to freely flow in response to the action of said tools into seam forming relation without breaking down, crushing or becoming otherwise damaged.

Other objects will in part be obvious and in part be pointed out hereinafter.

To the attainment of the aforesaid objects and ends my invention consists in the steps constituting said method hereinafter more fully described and then pointed out in the claims.

In the accompanying drawings:

Fig. 1 is a side elevation view, partly in section and with parts broken away, of a shell-forming mandrel and die which may be employed in carrying out the present invention, the mandrel being shown in expanded position and the external die in partially contracted position, and the section being taken substantially on line 1—1 of Fig. 2;

Fig. 2 is a cross-section of the mandrel taken on the line 2—2 of Fig. 1 looking in the direction of arrows;

Fig. 3 is a similar cross-section showing the parts in collapsed relation;

Fig. 3a is a diagram illustrating the principle employed in obtaining clearance for allowing removal of the shell from the mandrel;

Fig. 4 is a perspective of the container shell or body formed on said mandrel;

Fig. 5 is an enlarged end view partly broken away of said container shell showing the laminated structure thereof;

Fig. 6 is a fragmentary vertical section of the dies for the first stage of operation in forming the seam, the container body with the flanged head therein being shown positioned within the dies on an enlarged scale relative to the dies;

Fig. 6a is a fragmentary sectional view of the flanged head taken on the line 6a—6a of Fig. 6;

Fig. 7 is a fragmentary vertical section of the dies for the second stage of the seam forming operation;

Fig. 8 is a similar view of the tools for the third stage of the seam forming operation;

Fig. 9 is a diagrammatical view illustrating the beginning of the first stage of operation;

Fig. 10 is similar view illustrating the beginning of the second stage of operation;

Fig. 11 is a fragmentary sectional elevation illustrating the seam construction at the radial portion thereof, the body or shell of the container being shown in phantom; and Fig. 12 is an enlarged fragmentary section of the container through the seam.

Referring to the drawings, the container shell 10 to be fabricated in accordance with my invention is preferably composed of a plurality of plies, 11, 11a and 11b of paper stock (Fig. 12) secured together by a suitable adhesive 11c capable of strengthening or stiffening the paper component to form a strong, stiff structure and increasing the impervious qualities of said shell, a vegetable glue being at present preferred as the adhesive. The shell 10 may be formed on a suitable mandrel 12 either by winding a continuous sheet thereon and securing the overlapping plies together by the adhesive, or, as shown in Fig. 5, the shell 10 is preferably formed from a plurality of separate sheets with the lap seams 13 arranged alternately at opposite sides of the shell, the sheets 11, 11a, 11b being wound about the mandrel 12 in superimposed relation successively and secured together by said adhesive. In order to render the shell air and moisture proof, the inner ply or liner 11a of the shell is preferably reinforced with a metal or foil layer 14 which is secured to the ply 11a by a suitable adhesive having affinity for the foil such as adhesives having a rubber or latex base.

In forming the shell 10, the paper layers 11b forming the intermediate laminations may comprise paper stock of a cheaper quality with an outer layer 11 of superior quality adapted to form a printed label. If so desired, adhesives may be employed which are substantially moisture proof but of reduced stiffening properties to improve the impervious qualities of the shell, together with adhesives which are primarily relied on to augment the stiffness of the shell. For example, I find that the impervious qualities of the container are improved by provision of a moisture proof adhesive 11d, such for example, as that known as a mica adhesive, between the outer paper layer or label 11 and the contiguous inner layer 11b, the different adhesives 11c and 11d supplementing each other so that the resulting container wall is of the desired stiffness, strength and imperviousness, and the intermediate film or films of adhesive 11c being preserved against deterioration due to access of moisture thereto by the impervious inner foil layer 14 and the outer impervious adhesive film 11d.

The mandrel 12 illustrated at Figs. 1 to 3 is shaped to produce container shells other than circular in cross-section, such as the oblong or oval shaped shell having the flat sides 10a connected by the relatively narrow arcuate portions 10b of short radius shown at Figs. 4 and 5. With changes in the form of the product as may extensively be made within my invention, there will, of course, be corresponding changes in the form of said mandrel.

The mandrel means 12 comprises a bed plate or bolster 15, and the opposing mandrel segments 16 and 17 forming the supports for the flat side portions 10a of the shell and the interposed opposing mandrel segments 18 and 19 for supporting the arcuate connecting portions 10b of the shell.

The several segments 16—19 at their inner ends are provided with outwardly extending portions or feet 20 slidably engaging the bed plate 15 and retained in position thereon by the flanged member 21, the parts 15 and 21 forming guideways therebetween for said feet 20, and recesses for the springs 23 which are interposed between the ends of said feet 20 and the peripheral portion of the member 21 for causing contraction of said several segments, one of said springs being shown in Fig. 1.

The several segments 16 to 19 supported in position extending normally to the bed plate 15 are expanded, and firmly supported in expanded relation, by an actuating member 24 disposed within the confines of said segments and adapted to be reciprocated in expanding and allowing the contraction of said segments. For this purpose, the several segments longitudinally thereof have at their inner sides inwardly projecting portions 25 and 26 of reduced width providing bearing surfaces 27 and 28 coacting with the shoe portions 29 and 30 of the reciprocating member 24. The segments 16—19 extend for a substantial distance from the bolster 15 and, therefore to insure uniform application of the expanding force thereto to expand said segments without cramping of the parts, and to provide a uniform support throughout the length of said segments for preventing bowing when the same are in expanded position, the expanding shoes 29 and 30 are provided in pairs at opposite ends of the actuating member 24, said shoes being wedge-shaped and having downwardly and outwardly inclined edges 31 and 32 terminating in vertical edges 33 and 34. In order to allow the contraction or collapsing of the segments 16—19, the portions 25 and 26 have recesses 35 and 36 formed therein corresponding in shape with the shoes 29 and 30 and adapted to receive the same, said recesses providing upwardly and inwardly extending edges 37 and 38.

As shown at Figs. 2 and 3, the wider segments 16 and 17 extending parallel with the major dimension of the mandrel have flat intermediate portions 39 terminating in inwardly directed curving portions 40, the outer surfaces of which, when the mandrel is expanded, as shown at Fig. 2, registering with the curving surfaces 41 of the segments 18 and 19 to form therewith the narrow arcuate portions of the mandrel. This provides a continuous outer surface having a cross-sectional outline corresponding to the shape of the shell to be fabricated. The curving inner surfaces 42 of the portions 40 constitute cams cooperating with the segments 18 and 19 for supplementing the action of the shoes 29 in causing the expansion of the wide segments 16 and 17, the expanding force being applied to the wider segments 16 and 17 at three points to prevent cramping, canting or other distortion thereof and to provide a solid, firm support for the same at the ends and middle, the segments 18 and 19 when expanded entering between and engaging the flat edges 43 of the segments 16 and 17, for bracing and reinforcing the same at the ends.

When the parts are collapsed as shown in Fig. 3, the shoes 29 and 30 enter their respective recesses 35 and 36 and allow the bearing surfaces 28 of the reduced portions 26 of the retracted segments 18 and 19 to engage the stem of the actuating member 24, and the flat inner surfaces 44 of the segments 16 and 17 to engage the flat sides 44a of the segments 18 and 19, the reduced bearing portions 25 of the segments 16 and 17 being received into and closely fitting the space formed by said segments 18 and 19 and the reduced portions 26 thereof. When the mandrel is expanded the inclined edges 31 and 32 of the shoes 29 and 30 engage the corresponding inclined edges 37 and 38 to expand the several segments, the vertical edges 33 and 34 moving into engagement with the bearing surfaces 27 and 28 of the portions 25 and 26 to reinforce and support the segments in expanded position.

When the mandrel 12 is expanded the laminated or veneer paper shell 10 is formed thereon as above described. After the shell 10 is formed the mandrel is also utilized in forming inwardly directed ribs or beads 45 in the container shell 10 of a shape and for a purpose hereinafter more fully described. For this purpose, the segments 16—19 about the periphery thereof near the ends are provided with grooves 46 corresponding in shape with the desired bead form, and preferably of slightly greater depth than the bead to be formed to allow for the slight contraction in the depth of the beads or ribs 45 found to occur as a result of release of stress on the material when the dies are released therefrom. Cooperating die means 47 are disposed about the mandrel 12, and comprise a corresponding number of segments or jaws 48—48a having complementary ribs 49 thereon adapted to register with the grooves 46 and intermesh therewith. For convenience of illustration, one of said segments 48 is shown in expanded position and another segment 48a in contracted position. The segments 48—48a may be contracted and expanded by suitable actuating means and when contracted the material of the shell wall is drawn into the grooves 46 to form the beads 45 without stretching or distorting the material beyond its elastic limits. The die members 48—48a are preferably recessed to receive suitable heating elements 50 for facilitating the setting of the material of the shell 10 together with the ribs 45 into permanent form prior to expanding the dies 48—48a and contracting the mandrel 12.

In fabricating the shell or body of the particular oblong shape herein shown and described of greater length than width in cross-section, the outer surface or periphery of the mandrel when expanded must correspond thereto in shape and dimensions. To this end, the outer periphery of the mandrel includes straight side surfaces 51 having a separation equal to the minor dimension of the mandrel, said straight side surfaces merging with arcuate connecting surfaces 52 of substantially 180 degree arcs each having a radius R substantially equal to one half of the minor dimension, and including in part the curving portion 41 of the segment 18—19 and in part the contiguous curving portions 40 of the wider segments 16—17.

In the mandrel construction shown the metal lines 53 of the outer portions of the segments 16 and 17 are made sufficiently thick to form strong rigid structures while the segments 18 and 19 are made of substantial or block-like dimensions to render the same suitable for expanding the segments 16 and 17 and supporting the same in expanded position.

In order to obtain sufficient clearance when the mandrel is collapsed, it is necessary to move the ends or corners 54 of the segments 16 and 17 inwardly on the chord a (Fig. 3a) the required distance to cause said corners 54 to coincide with or come within the clearance line b representing the outline of the mandrel in the collapsed position thereof, the line c representing the outline of the mandrel in the expanded position thereof. In order to allow the required inward movement of the corners or points 54, the point d on the inner surface 44 of each side segment lying on the diameter line e of the curved surface 52 must travel inwardly on said diameter line a distance equal to d—f. The line g normal to said diameter line e at the point f, and demarking the boundary of the contiguous flat side 44a of the segment 18—19, should coincide with the corresponding corner 54 when the segment 16—17 thereof is in expanded position. In determining the location of the corners 54 the angle subtending the arc h of the outer surface 41 of the segment 18—19 must be so chosen that the chord a intersects the clearance line b with the point i thereon, representing the inner position of the corner 54, located within the confines of said clearance line. For a given desirable thickness of the metal line 53 of the segment 16—17 and for a given required clearance, the angle or arc of the curving surface h of the segments 18—19 must be confined to values ranging from 60 degrees (at which value the corresponding chord j is tangential to the clearance line) to 90 degrees (at which value the clearance at d—f becomes insufficient to allow the corners 54 to move into the confines of the clearance line b). For a mandrel of the relative dimensions herein shown, for example, for fabricating a container 3" long and 1" wide having a radius at the ends of ½" and requiring a clearance of 1/16", I find that the arcs $h$ should be and can be substantially 70 degrees to obtain the desired clearance without requiring the use of undesirably thin metal lines 53. To collapse the mandrel 12 the end segments 18—19 must move through a distance substantially equal to the length of the normal line $g$ in order to allow the required inward movement of the side segments 16—17.

The extent to which the foregoing principles can be utilized in the manufacture of mandrels of various sizes and dimensions requiring different clearances and metal lines may be readily determined, once the principles are understood. The principles of construction are particularly applicable to mandrels requiring relatively small clearances, not exceeding about one-eighth of the radius of the curved ends, the clearances obtainable being inversely proportional to the thickness of the metal line 53.

The oblong body 10 formed tends to bow or sag inwardly at the opposite sides 10a thereof which is obviated by forming or drawing the inwardly directed beads or ribs 45 (also forming the complementary outward grooves 45a) in the wall of the body 10 adjacent to the opposite ends thereof in the manner above described. The ribs 45 not only reinforce the body 10 and maintain the body walls in parallelism without bowing but also insure the formation of sockets 56 at the ends of the shell 10 of predetermined or gauge dimensions for receiving the end closures or heads 57 (Fig. 6) adapted to closely and smoothly fit said sockets 56 evenly seated upon the ribs 45 to form a joint 58, the marginal portion 56a of the shell 10 projecting beyond the edges of the flange 57a of the heads 57. The ribs 45 serve as templates or gauges for determining the positions of the heads 57 within the shell and for properly locating the same relative to the marginal edges 56a of the body to enable the seam forming operation.

The ribs 45 also serve as ledges or abutments for receiving the thrust of the heads 57 during the seam forming operation and after the container is formed, and obviate the need of the use of an internal mandrel or support for the head when the seam is being formed, as hereinafter described. To this end, the groove 45a is made of substantial depth, extending inwardly beyond the projection of the inner surface of the flange 57a.

The ribs 45 in order to effectively resist thrust or pressure are made of strutted or braced formation, and therefore differ materially from the ordinary arcuate rib of slight depth. Each rib is formed with a ledge portion 59 extending inwardly substantially horizontally or at right angles to the wall 10, a vertical intermediate portion 60 and an inclined portion 61 merging with the vertical part 60 and the body wall 10 and being disposed at an angle of about 45 degrees to the horizontal or transverse plane. The portions 60—61 serve as a strut or brace at the inner end of the part 59 for receiving and supporting the thrust or pressure imposed thereon.

In forming the rib 45 into the shape above described by means of the correspondingly shaped die members, the easy angular relationship of the parts 60—61 with reference to the shell wall allows a deep groove having the right angular portion 59 to be formed by a drawing operation without imposing stresses or strains upon the material beyond the elastic limits thereof tending to break down or otherwise weaken the rib, and said portions 60—61, because of the reduced distorting action imposed on the material in forming the same, provide a reinforcing structure for the right angular portion 59 of substantial resistance or strength comparable to that of the original body structure.

The flanged head 57 shown in Figs. 6 and 12 is particularly adapted structurally for fitting the sockets 56 of the shells 10 in a smooth, close fitting relation with the wall thereof without buckling, wrinkling or ruffling in order to maintain the flange 57a in proper alignment with the dies used in the seam forming operation to be described. The head is also fabricated or constructed in a manner to allow the material thereof to be turned over in the seam forming operation without breaking down the material, particularly at the inner portions of the flange, and without requiring pressures to be imposed thereon liable to cause injury to the rib 45, or distortion of the head 57, or impairment of the close fitting relation between the flange 57a and the shell wall, or of the hermetic qualities of the joint 58.

The head 57 shown is particularly adapted for use in the fabrication of containers other than circular, and particularly containers of materially greater length than width in cross-section having radial or arcuate portions of relatively short radius (substantially equal to one-half of the length of the minor dimension) connecting the flat side portions of substantial or major dimension. A similar head and the method of fabricating the same is shown and described in my application filed April 17, 1934, Serial No. 720,920, and in my Patent No. 2,081,759, the head per se and the method of making the same being shown and described in detail in said above identified application and claimed therein.

As may be inferred from an inspection of Fig. 12, the head is fabricated by drawing a flat blank composed of a laminated structure comprising a layer of foil 62 backed by a plurality of layers of paper 63. The foil 62 is secured to the contiguous paper layer by a suitable adhesive 64 having elastic properties, such as adhesives having a latex base which facilitate the formation of the head and the turning over thereof in the seam forming operation, and the paper layers are secured together by an adhesive 65 of substantial body and stiffness forming with the paper a strong stiff reinforcing structure for the foil layer, the foil rendering the body impervious to air, moisture and other fluids and, because of the deformable character thereof, retaining the flanged head when formed in shape with the flange 57a thereof substantially vertical, and hence contributing in securing the close fitting relation between the flange and body wall above described and in enhancing the hermetic or impervious qualities of the container.

The upper portions of the curving or arcuate ends 66 of the flange 57a are provided with notches 67 (reduced in size compared to their original size) for reducing the tendency of the flange to flare outwardly at the ends and allowing the flange to be formed with the material thereof at the ends in proper condition for flowing in the seam forming operation, obviating the tendency for the material to become hardened or embrittled to an extent interfering with the flowing operations because of excessive compression imposed thereon during the flange drawing operation due to crowding of the unremoved excess material within an arcuate portion of reduced radius compared to the original radius of the end margins of the blank. The notches 67 in the arcuate flange portions also contribute, especially when the container is of the oblong shape herein shown and described, in obtaining uniform registry of the head 57 with the body wall 10, and in forming a seam of uniform material content and cross-section in both the arcuate and straight portions thereof.

I also provide notches 68 in the upper portion of the flange 57a substantially at the junctures of the arcuate end portions 66 and the straight side portions 66a for obviating or minimizing compression pressures on said side portions exerted by the end portions 66 when the heads are forced into the sockets 56, obviating the tendency of said side portions of the flange to buckle, wrinkle or overlap the end portions 66. The notches 68 as shown in Fig. 6 are reduced compared to the size thereof as formed in the blank, the original notches having had blunt inner apices of sufficient width to compensate for the spreading of the material of the arcuate portions 66 during the flange drawing operation, obviating the tendency of said arcuate portions to flare because of the resistance of the side portions 66a to inward movement of the end portions 66. The original notches 67 allow the arcuate portions to be formed vertical, and also allow the head to be inserted into the sockets 56 in the desired close fitting relation without buckling.

I also provide means for facilitating the turning over of the margins of the relatively stiff, long, side portions 66a of the flange 57a in the seam forming operation without breakdown of the flange or requiring the application of pressures thereto liable to force the head from its seat on the abutment formed by the bead 45, or cause the collapse thereof.

The particular means herein disclosed for facilitating the flange flowing operation comprises, as illustrated at Figs. 6 and 6a, a series of longitudinally extending, parallel flutes 69 of substantial depth formed in the inner surfaces of the straight flange portions 66a during the flange drawing operation by means of suitable ribs formed upon the male die employed in the flange drawing, the female die employed insuring the formation of flange portions 66a having substantially smooth, flat outer surfaces, as indicated at 69a.

The fluting 69 forms a wall of alternately reduced and enlarged thickness, the material along the longitudinal lines of reduced thickness 69b being highly compressed relative to the material along the lines of greater thickness 69c. The lines 69b of compressed material thus form reinforcements extending longitudinally of the side portions 66a and contributing to maintain the walls 66a vertical and in close fitting relation with the contiguous surfaces of the shell 10, and provide transversely a succession of lines of bend for facilitating the turning over of the flange in the seam forming operation. The fluting 69 is also very effective in mechanically locking the foil and paper plies 62—63 together to prevent separation or fraying thereof at the flange edge.

The fluting 69 is particularly adapted for facilitating the turning over of straight flange portions in forming seams for containers of the particular shape herein shown and described and thereby compensating for the relatively greater resistance of non-arcuate or straight flange walls 66a to the turning or curling operation compared to the resistance of the end portions 66 of the flange 57a which may be more readily turned over because of the notches 67 and arcuate shape thereof, the turning over of such arcuate portions being inwardly radially towards the center. However, in the formation of seams or reinforcements for containers of other forms, the fluting 69 can be advantageously employed for facilitating the flowing or curling of arcuate flange portions.

The fluting 69 also cooperates with the notches 67 and 68 and with the foil component of the flange 57a in obtaining the smooth uniform, close fitting relation between the flange 57a and body 10 desirable for proper coaction with the seam forming dies as hereinafter described, and also places the material of the relatively stiff straight side portions 66a in condition to be responsive to the curling operation to the same extent as the material of the notched arcuate end portions 66, thereby enabling a uniform turning over of the flange throughout the extent thereof without breakdown of the material or dislocation of the head 57 because of the excessive pressures which would otherwise be required to effect the curling over of the material.

The lower portion 70 of the flange 57a is uninterrupted entirely around the periphery thereof providing a portion of substantial depth in uniform close fitting relation to the shell wall 10 to form a joint of hermetic character particularly when a sealing medium, such as paraffine, latex or a suitable adhesive is disposed between the contacting surfaces.

The head 57 is also drawn with a rib 71 formed at the juncture between the flange 57a and the flat base 72, and serving to reinforce and stiffen the article about the margin thereof, to retain the same in shape against warping due to shrinkage. The rib 71 provides a relatively deep recess or groove 71a at the inner side of the head between the bottom 72 and the inner side of the flange 57a for receiving as hereinafter described the lower portion of the reinforcing seam 73 as shown in Figs. 8 and 12. For this purpose, the rib 71 comprises a wall portion 74 (Fig. 8) of substantially a 90 degree arc described about a center located on the opposing inner surface of the flange wall 57a and having a radius substantially equal to the total thicknesses of the plies of the seam 73 to be received and anchored in the groove 71a. The arcuate portion 74 at one end merges into a straight wall portion 75 (Fig. 12) substantially normal to the bottom 72 and at its opposite end merges into a straight wall portion 76 substantially normal to the flange wall 57a.

The rib 71 as thus constructed provides a yieldable or elastic connection between the bottom portion 72 and flange 57a, compensating for shrinkage as the article dries and tending to supplement the foil 62 in keeping the flange 57a substantially normal to the base against outward expansion. The yieldability of the rib 71 also facilitates the insertion of the head 57 into the socket 56 of the shell 10 and allows, supplementary to the notched formations 67 and 68, the head 57 to be forced into place without causing canting, buckling, wrinkling or other deformation of the flange 57a or bottom 72.

The head 57 is inserted in position with the bead 71 resting upon or engaging the squared abutment or shoulder 59 formed in the container wall, the shoulder 59 and the portion 76 of the bead 71 having a right angular interengagement, the corner of the bead 71 fitting into the corner of the shoulder 59 to form the joint 58. To improve the hermetic qualities of the joint 58 a suitable sealing material may be disposed therein to form a gasket seal 77. For example, a layer of latex or rubber in a fluid state may be disposed upon the bead 71 and the head 57 then inserted in place. Upon application of heat this material sets to form an elastic gasket 77 between the parts supplementing the hermetic qualities of the juncture between the flange 57a and the body wall 10 provided because of the closeness of the fit between said parts.

The shoulder 59 effectively resists axial movement of the head 57 under the pressures or stresses applied lengthwise of the container and prevents the head from becoming dislodged therefrom when bending and canting strains are imposed thereon, the bead 71 and shoulder 59 cooperating to resist stresses and strains imposed on the container liable to cause distortion of the bead 71 and allow the seam plies to be released therefrom and loosened.

The width and the depth of the groove 71a allow the plies of the seam 73 to be forced into interlocking relation with the groove upon application of pressure lengthwise of the plies as hereinafter described. The parallel or straight portions 75—57a of the groove 71a serve to prevent rocking or swinging of the interlocked end of the plies on the 90 degree arc of the wall portion 74 out of engagement with the groove, the plies, in effect, being keyed within said groove against movement. The depth of the groove 71a is such that the extended plane of the bottom 72 intersects all of the parallel plies of the seam including the flange ply 78 which is embedded between the ply portions formed from the marginal portion of the body, and which has the end thereof extending into the confines of the groove. When thus embedded the inturned parts of notched end portions 66 form substantially a continuous structure with the notches 67 drawn together as shown in Fig. 11 at 67a. The interlocking structure provided at 71a resists stress or pressure on the seam in all directions.

The bottom 72 also serves as a brace or strut disposed inside of the seam body to resist inward movement or loosening of the plies thereof. Stress on the seam plies directed lengthwise thereof in either direction is resisted by the engagement between the loops or bends and complementary ends of the plies.

At Figs. 6 to 10, I have illustrated the instrumentalities for forming the seam 73 in accordance with my method. Said method constitutes an improvement upon the method claimed in Letters Patent 1,870,062 granted to me August 2, 1932, and is employed for forming multiple ply reinforcements, seams or joints, and particularly for forming said seams or joints without the use of internal supports. By constructing the containers in accordance with this method I am able to insert the head in one end of the container and form the seam, and after the material or substance constituting the contents of the container is disposed therein through the opposite end of the container the remaining head 57 is placed in position at the latter end and the seam formed, the method for forming both seams being the same.

In order to hold the container shell 10 in position during the seam forming operation, a chuck 79 comprising gripping jaws 80 is disposed about the shell 10 at the opposing sides 10a and 10b of the container shell and adapted to be contracted about the periphery of the shell 10, to closely grip or engage the same without causing buckling thereof, the jaws 80 having ribs 81 thereon corresponding in shape with the grooves 45a and extending into and fitting said grooves. The ribs 81 are of slightly reduced projection compared to the depth of the ribs 49 and complementary grooves 46 of the tools or dies employed in forming the shell grooves 45a so as to fit the groove 45a closely without bowing the shell wall and moving the same out of alignment with the curling tools, compensation thus being made for contraction of the rib 45 when the forming tools therefor are released. The chuck 79 is provided with a similar rib at its opposite end so that both grooves 45a of the shell 10 are engaged and the shell is supported externally over a substantial portion of the length thereof. When the chuck 79 is contracted about the shell, the ribs 81 effectively reinforce the shell ribs 45 and, because of the depth thereof, the pressures applied to the flange 57a are transmitted through said ribs 45 on a line intersecting the external supporting ribs 81. The end of the shell 10 to be sealed is received into the hollow die bolster 82 in close fitting relation with the interior surface 83 thereof which corresponds in shape with that of the shell 10.

The gripping jaws 80 have recesses 84 therein receiving springs 85 bearing against the bolster 82 and serving to expand the chuck to the position shown in broken lines in Fig. 6 when the actuating means 86 for closing the jaws is released. The actuator 86 comprises a tubular member disposed about the bolster 82, the contiguous portions of the jaws 80 and actuating member 86 having coacting inclined camming surfaces 87 for facilitating the jaw closing operation.

In order to facilitate the flowing of the marginal portion 56a of the shell 10 into the multiple ply relationship shown at 73a (Fig. 7), I impose a directive bias upon the material by forming a curl 88 of relatively short radius about the margin of the shell 10 in spaced relation to the edge of flange 57a. This preliminary curling operation is accomplished by a tubular die member 89 slidably disposed within the bolster 82 and having an endless arcuate groove 90 formed in and about the lower edge thereof, said groove having a transverse curvature of relative short radius, and preferably being disposed in a plane at a slight angle, for example, at an angle of one degree, to the plane coincident with the marginal edge of the container shell 10, the groove 90 being inclined relative to the axis of the die 89 in the direction of the major dimension thereof.

When pressure is applied to the die 89, the latter is moved from the position shown in broken lines (Fig. 6) downwardly to the position shown in full line. During this movement, because of the inclination of the curling groove 90, the inturning or curling of the margin 56a of the shell starts at a point 91 at the right looking at Fig. 9 and progresses along the opposite sides of said margin to an opposite point, the outer portion 90a of the groove 90 forming a knife edge serving to shear the marginal portion of the flange inwardly away from the surface 83 of the bolster. By this method the margin 56a can be curled without imposing pressures thereon liable to break down the container wall, the pressure being applied initially at one point on the margin. Hence, upon downward movement of the die 89 the margin of the shell 10 progressively turns over from point to point along the opposing peripheral portions of the margin. The downward force exerted on the shell 10 at the moment of contact of the die 89 therewith is substantially reduced compared to the force that would be required to curl over upon such a short radius the entire margin simultaneously. By progressively curling over or inturning the margin of the container in the manner above described, which action may be compared to a shearing, a bias curl of definite uniform character may be obtained without breaking down the wall structure. Fig. 9 illustrates diagrammatically the relative position of the margin of the shell 10 and die 89 at the instant of contact, the application of the force then progressing from point to point around the periphery of the container body. This method allows the utilization of a much smaller force for overcoming the resistance of the body wall to the curling action upon the initiation thereof at each point, a greater force being required to start the curling over of the material at the instant of contact of the die 89 with the shell margin than at the later stage of the operation.

The bias curl 88 resulting from the foregoing method is shown in section in Fig. 6 and diagrammatically in Fig. 10, the curl produced lying on a plane inclined in the direction of the major dimension of the shell and relatively to the axis thereof.

For the second stage of the seam forming operation, the die 89 is removed and the hollow flowing die 92 having an endless arcuate groove 93 in the lower edge thereof of longer radius is received into the bolster 82, said groove being disposed on a plane substantially at right angles to the axis of the die, and hence, as shown in Fig. 10, on a plane in angular relation to the inclined bias curl 88. A retaining member or sleeve 94 is disposed within the die 92 with its lower edge 95 engaging the base 72 of the flanged head 57, and provides a surface 96 at the outer side thereof for guiding the material during the curling or flowing operation.

The initial position of the die 92 is indicated in broken line at 97 (Fig. 7). When in this position, the die 92 contacts with the bias curl 88 at a point 98 as illustrated diagrammatically in Fig. 10. As the die 92 moves downwardly, the material of the body wall is sheared inwardly away from the bolster wall, the outer side 93a of the groove 93 being formed as a knife edge, and is caused to flow or curl inwardly on a relatively broad radius (which may be of the order of twice the radius employed in forming the bias curl 88). The curling over, because of the angular relation of the die and bias curl, is progressive from the point 98 along the opposite sides of the curl to the opposite end thereof. The thrust of the die is initially localized at the point 98 and the curling operation is greatly facilitated without requiring the application of pressure liable to break down the material or cause the head 57 to be forced from its seat on the bead 45 of the shell or cause said seat to yield axially. The initial resistance or inertia of the material to the curling operation is overcome by applying pressure to the bias curl progressively from point to point along opposite sides of the periphery of the container without requiring the application of pressures of an order liable to break down the material or cause dislocation of the parts, the method being substantially the same in principle as that employed for forming the bias curl.

As the curling operation proceeds the material is curled downwardly by the arcuate groove 93 and guided along the surface 96 which keeps the material within the desired confines and causes the same to flow in the proper plane. The directive bias imposed on the advancing edge 56a of the material by the bias curl 88 now becomes effective to cause said advance edge portion 56a to curl or turn outwardly and move in reverse direction against the direction of the application of the curling force, the advance edge 56a clearing the base 72 of the head 57 and the inner side of the flange 57a and moving into position between the flange portion 70 and the inturned portion 78 of said flange which has during this operation been curled over with the marginal portion of the shell as shown in Fig. 7, the side portions 66a being curled over successively about the lines of bend 69b formed by the fluting 69.

By properly designing the bias curl radius and the extent of preliminary curling the ply portions may be brought into intercalated relation without requiring tracking or guidance by the walls of the enclosure in which the curling takes place, which is liable to break down the material, and without said advance edge 56a engaging head on or jamming into the edges of the base 72 of the head 57 or flange portion 70. In like manner, the radius of the groove 93 is gauged to allow the material of the marginal portion of the body and of the flange 57a to freely flow without undue departure from natural form, and to allow the advance portion 56a under the directive bias imposed thereon to freely move into ply forming relation without interference due to lack of space, and in so doing to clear both the base 72 and the flange 57a of the head.

After flowing or curling the material into the intercalated or ply forming relation as shown at 73a (Fig. 7), the members 92 and 94 are removed and the members 99 and 100 (Fig. 8) substituted therefor for performing the third stage of the seam forming operation which consists in solidifying the seam and forcing the same into the peripheral groove 71a against the foil portion 62 therein by application of pressure thereto in a plurality of angularly related directions, i. e., by applying pressure laterally to the inner side of the plies to cause the same to align with the groove 71a and then lengthwise of the plies 73a while confined laterally to cause the same to align or interlock with each other lengthwise and to be compressed or expanded into the groove 71a, the plies tending to thicken because of the vertical pressure applied.

For applying the lateral pressure to the seam plies I employ the expansible member 99 comprising a plurality of segments 101 adapted to be expanded by a reciprocable member 102 having laterally projecting wedge-shaped shoes or cams 103 including inclined edges 104 adapted to coact with the inclined edges 105 of the recesses 106 in said segments, and including straight edges 107 adapted to cooperate with the straight inner surfaces 108 of the segments, the structure being similar to that of the shell forming mandrel 12.

The packing pressure on the plies in a vertical or lengthwise direction is applied through the hollow packing member 100 slidably disposed within and fitting the bolster 82 and receiving the member 99 which when in the expanded position, conforms to the shape of the interior of said vertically movable packing member 100. The inner edge of the member 100 has an arcuate, seam shaping groove 109 therein for correspondingly shaping the outer margin of the seam.

In applying the consolidating or packing pressure to the seam plies 73a the member 100 is initially disposed within the bolster in elevated position as indicated at 110 in broken lines with the member 99 disposed within member 100 in contracted position as indicated at 111 in broken lines. When the actuating member 102 is moved upwardly the inclined portions 104 and 105 engage each other to cause expansion of the segments 101 and move the plies 73 into parallelism and into alignment with the groove 71a to be retained within a space equal to the width of the packing member 100, the width of the latter being slightly greater than the combined thicknesses of the plies. After the lateral packing operation, the packing member 100 is then moved downwardly upon the material to first cause the ends and bends of the folds or plies to abut and further interlock, the contiguous plies being sufficiently separated or loose because of the width of the member 100 to allow relative sliding movement thereof, and then to force the plies downwardly into the groove 71a to form the seam 73 with the plies expanded or compressed into the foil reinforced groove 71a as above described.

The method above described for forming the bias curl 88 and then the intercalated plies 73a may be advantageously employed for forming seams or reinforcements about marginal portions of containers including straight wall portions of substantial length which offer more resistance to curling operations than the connecting arcuate wall portions for the reason above stated, and particularly for forming seams and joints without the use of internal support, such as in my method whereby the stresses and strains imposed upon the marginal portions upon application of the seam forming pressures thereto are resisted by the inwardly directed bead, abutment or ledge 45 of the shape above described reinforced and supported externally by the rib 81 extending into the complementary groove 45a, the shell 10 being supported externally by the bolster 82 and chuck 79. In my method the stresses and strains imposed upon the marginal portion 56a of the shell and upon the flange 57a by the tools 89, 92 or 100 are transmitted to and sustained by the squared shoulder 59 of the rib 45 backed up by the rib 81 without danger of the beaded portion 71 of the head skidding out of position. The direction of application of the forces about the periphery of the container at all points is on lines intersecting the beads or ribs 45—81. This is rendered possible because of the closeness and uniformity of fit between the outer surface of the shell 10 and the contiguous surfaces of the bolster 82 and chuck 79 and between the flange 57a and the inner surface of the body wall portion 56a, buckling, bowing or distortion of the walls being obviated so as to insure a perfect uniform alignment of the marginal wall portions with the tools entirely around the periphery of the container.

Furthermore, in my method the amount of pressure required to curl the marginal material is substantially reduced because of the particular method employed for flowing the material progressively from point to point along the periphery in the first two stages of the seam forming operation, thereby relieving substantially the stresses and strains to be imposed upon the ledge 59, and because of the structure of the flange 57a, including the notched structure 67 of the arcuate portions 66 and fluted structure 69 of the elongated straight side portions 66a of said flange which greatly facilitates the turning over of the flange to form the ply 78, minimizing appreciably the stresses required to be sustained by the abutment 59 upon the application of the seam forming pressures.

The outside of the container is preferably covered with a suitable casing, sheath, skin or film of a material preferably transparent or diaphanous and impervious to air, moisture, etc., the material being applied in a liquid or fluid state by blowing the same in a finely divided state upon the surfaces of the container, or by otherwise applying the same and allowing the same to harden.

As shown in Fig. 12, the joint or seam 73 comprises a compact, interlocking multiple ply structure including the outer body wall 10, the contiguous flange ply 70, the inwardly and downwardly directed ply or fold 56b of the body, the inwardly and downwardly directed ply 78 of the flange at the inner side of the shell fold or ply 56b and the reversely directed terminal portion 56a of the body interposed between the ply portions 70 and 78 and between the foil 62 thereon, the notches 67 of the arcuate portion of the ply 78 being now drawn together as shown at 67a (Fig. 11). The foil layer 14 at 14a is also embedded in the joint 73 between the body 10 and flange portions 70—78, and at 14b is in contact with a portion of the foil 62 of the head 57 centrally within the joint. The gasket seal 77 between the ledge 59 and the head reinforcement 71 serve to form a tighter joint at the junction 58.

The foil portions 14 and the portions or plies of the foil 62 on the head 57 are brought by the compacting pressure applied to the seam in directions at right angles to each other into close contact with the contiguous ply portions to form a gasket seal within the seam 73 effectively preventing passage of air or moisture through said seams at the juncture of the plies.

By my invention, containers, and particularly containers having straight and arcuate side portions, may be fabricated in quantity at low cost. The resulting container is strong and durable, of light weight and of pleasing appearance, and substantially impervious to air and moisture, forming a hermetically sealed package capable of preserving the contents thereof in condition for prolonged periods.

By constructing containers in accordance with my invention the resulting seams 73 including the arcuate and non-arcuate portions thereof are made of uniform gauge dimensions, capable of being uniformly engaged by a suitable cover or closure, and minimizing the height of the container.

In my method the paper components of the shell and heads are reinforced or supplemented by metal or foil which allows the container forming operations without damaging the material, enhances the strength and durability of the container and renders the walls and seams thereof impervious to air and moisture.

Having thus described my invention what I claim and desire to secure by Letters Patent is:

1. The method of making a container which comprises forming a paper shell with an inwardly directed rib therein and a groove complementary to said rib near one end of said shell, placing a flanged head in said shell against said rib, and interlocking the flange and contiguous wall portion of the shell together while supporting said shell externally by means registering with said groove.

2. The method of making a container which comprises making a paper shell with substantially flat wall portions connected by arcuate wall portions, placing within said shell a correspondingly shaped flanged head with notches in the margins of the arcuate flange portions and relatively enlarged notches at the junctures of the flat and arcuate flange portions for insuring a uniformly smooth, close fitting relation between the contiguous shell and flange walls, and flowing the marginal portions of said shell and said flange into intercalated relation by the application of pressure thereto lengthwise thereof.

3. The method of making a container which comprises forming a paper shell, disposing a flanged head within said shell with the margin of said shell projecting beyond said head, curling the projecting marginal portion of said shell upon a radius, and then flowing the marginal portion of said shell and of said flange upon a relatively wider radius than said first named radius to cause the marginal portion of said shell to move under a directive bias imposed on the material by the first curling operation into intercalated relation with the opposing plies of the flange.

4. The method of making a container which comprises subjecting the marginal portion of a paper shell to the action of a die member moving axially of the shell at an angle to the margin thereof to cause flow of said marginal portion progressively from point to point thereon.

5. The method of making a container which comprises flowing the marginal portion of a paper shell from one point thereon to an opposite point progressively along opposite sides of said marginal portion.

6. The method of making a container which comprises forming a paper shell of greater length than width, shearing over the marginal portion into a curl upon a relatively short radius progressively in the direction of the major dimension thereof by the action of an axially movable die, and then flowing said marginal portion into intercalated relation upon a broader radius under a directive bias imposed by the first curling operation.

7. The method of making a container which comprises forming a paper shell with an inwardly directed ledge therein, forming a flanged head with a peripheral reinforcement at the juncture of the flange and the base thereof, said reinforcement providing a groove upon the inner side of said head, placing said head within said shell with said reinforcement engaging said ledge, forming a preliminary curl upon the adjacent margin of said shell, flowing the marginal portions of said shell and flange into intercalated relation above said groove, applying pressure laterally to the intercalated plies to align the same with said groove, and then forcing the plies into said groove.

8. The method of forming a container which comprises forming a paper shell, forming an inclined curl on the margin of said shell by the action of an axially movable die disposed at an angle to the plane of the margin of said shell and contacting with the material progressively to form said curl, and then flowing the material upon a broader radius into intercalated relation under the directive bias imposed on the material by said first curling operation by the action of a die contacting with said first curl progressively in the direction of slant thereof.

9. The method of forming a container which includes the steps of drawing a portion of the body wall of a fibre shell between coacting die members of complementary shape to form an inwardly directed rib, the material of the rib being drawn at one part thereof substantially into right angular relation to the body wall and at the other part thereof into less abrupt angular relation to the body wall by the action of the dies so as to minimize stress on the material, said material being placed by said die members under a tension not exceeding the elastic limits of the material in forming a rib of an original depth greater than that required, and said depth being predetermined so that upon release of the die members the material sets or relaxes to the extent required for forming a rib of a depth appreciably greater than the wall thickness.

10. The method of making a closure formation for a paper shell having a flanged head fitted therein which includes the steps of curling the marginal portion of the shell, and then flowing the marginal portion of the shell and the flange of the head upon a radius wider than that employed in the curling step.

11. The method of curling the marginal portion of material to be formed which comprises flowing said marginal portion from one point to another thereon progressively by the action of a die member having the operating face thereof disposed at an angle to the line of the edge of said marginal portion.

12. The method of making a closure formation for a container which comprises simultaneously curling the marginal portion of a shell and a flange on a head for said shell to interlock the same, subjecting the curled plies to lateral pressure, and then forcing said plies into a marginal depression in said head.

13. The method of making a container which comprises forming a paper shell, forming an internal rib and an external groove complementary thereto in the wall of said shell by the action of complementary die members, and supporting said shell by a member extending into said groove and corresponding in shape thereto while subjecting the marginal portion of the shell to a curling action.

14. The method of making a container which includes forming a laminated shell comprising fibrous laminations adhesively secured together, disposing a head in said shell constituted by a blank having foil and fibrous laminations and the marginal portion thereof drawn into a smooth seamless flange, and flowing the marginal portion of the shell and the flange of the head into intercalated relation to form a foil reinforced seam.

15. The method of making a container which includes the steps of forming a laminated shell comprising fibrous laminations on a mandrel having an uninterrupted periphery when expanded, forming an internal rib in said shell intermediate the ends of said mandrel, and contracting said mandrel to reduce the outline of the same entirely around the periphery thereof sufficiently to allow said ribbed shell to be removed therefrom.

16. The method of making a container which includes the steps of forming a shell by successively wrapping a plurality of fibrous blanks about a collapsible mandrel having a greater length than width and an uninterrupted periphery when expanded, adhesively securing each blank to a contiguous blank throughout its area during the wrapping operation, drawing an internally projecting interrupted rib having a complementary exterior groove in the wall of said container intermediate the ends thereof with an external die member having a rib adapted to cooperate with a groove in said mandrel intermediate its ends, releasing said shell by collapsing said mandrel to reduce the outline of the latter entirely around the periphery thereof, and supporting said shell by means having a rib adapted to register with the groove in said shell while inserting a flanged closure into said shell in contact with the rib in the wall of the latter, flowing the marginal portion of said shell into overlapping relation with the flange of said closure by means of a non-rotating tool, and pressing said marginal portion and flange into intimate contact with one another.

17. The method of making a container which includes the steps of forming a paper shell with an inwardly directed ledge therein, forming a flanged head with a peripheral reinforcement at the juncture of the flange and the base thereof, said reinforcement providing a groove upon the inner side of said head, placing said head within said shell with said reinforcement engaging said ledge, flowing the marginal portion of said shell into overlapping relation with said flange, directing the edge of said marginal portion into said groove, and pressing said marginal portion and flange into intimate contact to form a tight seam between said shell and head.

18. The hereindescribed method of sealing a container comprising fibrous materials which includes the steps of securing an end closure in one end of the container body, filling the container with material to be canned, inserting a flanged closure in the other end of the body, and supporting the container and contents by means extending into exterior grooves in the walls of said body while flowing the marginal portion of the body into overlapping relation with the flange of said last-named closure to lock the same together.

19. The method of making a container which includes forming a shell, and drawing an internal rib in the wall of said shell intermediate the ends thereof while supporting said wall by means closely engaging the same about the entire inner periphery of the shell on opposite sides of said rib.

20. The method of making a container which includes forming a shell, and drawing an internal rib in the wall of said shell intermediate the ends thereof by subjecting the same to pressure by pure linear movement of a die member while supplying interior support to said wall for a substantial distance on and along each side of said rib.

21. The method of making a container comprising fibrous material which includes the steps of forming a shell with an inwardly directed rib therein and an external groove complementary to said rib near one end of said shell, placing a flanged head in said shell in contact with said rib, and curling the marginal portion of the shell into overlapping relation with the flange of said head while holding said shell by means externally thereof and extending into said groove.

22. The method of making a container which includes the steps of forming a shell comprising fibrous materials, forming an internal rib and an external groove complementary thereto in the wall of said shell, and holding said shell against movement by a member extending into said groove while subjecting the marginal portion of the shell to a curling action.

23. The method of making a container which includes the steps of forming a shell on a mandrel, forming an internal rib in said shell intermediate the ends of the mandrel, and contracting said mandrel sufficiently to allow said shell to be removed therefrom.

24. The method of making a container which includes the steps of forming a shell on a mandrel, forming an internal rib in said shell intermediate the ends of said mandrel, contracting said mandrel sufficiently to allow said shell to be removed therefrom, inserting a flanged head into said shell in contact with said rib, and curling the marginal portion of said shell into overlapping relation with the flange of said head.

25. The method of making a container which includes the steps of forming a shell on a mandrel, forming an internal rib and complementary external groove in said shell intermediate the ends of the mandrel, contracting said mandrel sufficiently to allow said shell to be removed therefrom, and holding said shell against movement by means extending into said groove while subjecting the marginal portion of the shell to a curling action.

26. The method of making a container which includes the steps of forming a shell on a mandrel, forming an internal rib and an external groove complementary to said rib in the wall of said shell intermediate the ends of the mandrel, contracting said mandrel sufficiently to allow said shell to be removed therefrom, inserting a flanged head into said shell, and curling the marginal portion of said shell into overlapping relation with the flange of said head while holding the shell against movement by means extending into said external groove.

GEORGE ARLINGTON MOORE.